(12) United States Patent
Beese

(10) Patent No.: US 6,610,763 B1
(45) Date of Patent: Aug. 26, 2003

(54) POLYMER COMPOSITION, THE PRODUCTION AND FURTHER PROCESSING THEREOF INTO RECEPTACLES

(75) Inventor: Ulrich Beese, Wustrau (DE)

(73) Assignee: Gebr. Otto GmbH & Co. KG, Cologne (DE)

(*) Notice: Subject to any disclaimer, the term of this patent is extended or adjusted under 35 U.S.C. 154(b) by 217 days.

(21) Appl. No.: 09/381,444

(22) PCT Filed: Jan. 8, 1999

(86) PCT No.: PCT/EP99/00068
§ 371 (c)(1),
(2), (4) Date: Aug. 23, 1999

(87) PCT Pub. No.: WO99/37710
PCT Pub. Date: Jul. 29, 1999

(30) Foreign Application Priority Data

Jan. 22, 1998 (DE) .......................... 198 02 142

(51) Int. Cl.$^7$ .......................... B65D 85/82; B28B 3/20; C08K 5/13
(52) U.S. Cl. .................. 523/122; 206/524.2; 206/524.3; 206/524.4; 206/524.9; 264/176.1; 264/209.1; 264/211.2; 521/47; 521/48; 524/330; 524/333; 524/339; 524/341; 604/265
(58) Field of Search .................. 524/330, 333, 524/339, 341; 523/122, 351; 521/48, 47; 604/265; 206/524.2, 524.3, 524.4, 524.9

(56) References Cited

U.S. PATENT DOCUMENTS

| | | | | |
|---|---|---|---|---|
| 2,919,200 A | * | 12/1959 | Dubin et al. .................. 523/122 |
| 3,006,870 A | * | 10/1961 | Steinfatt et al. ............. 523/122 |
| 3,075,940 A | | 1/1963 | Pazinski et al. |
| 3,146,273 A | * | 8/1964 | Orloff et al. .................. 523/122 |
| 3,198,764 A | * | 8/1965 | Lowes ........................ 523/122 |
| 3,224,974 A | | 12/1965 | Boag et al. |
| 3,324,201 A | * | 6/1967 | Peiser et al. ................. 523/122 |
| 3,506,720 A | * | 4/1970 | Model et al. ................. 523/122 |
| 4,842,593 A | * | 6/1989 | Jordan et al. ................ 604/360 |
| 5,013,306 A | * | 5/1991 | Solomon et al. ............. 523/122 |
| 5,035,691 A | | 7/1991 | Zimmer et al. |
| 5,124,388 A | | 6/1992 | Pruett et al. |
| 5,159,015 A | | 10/1992 | Hamersma et al. |
| 5,298,540 A | | 3/1994 | Pauquet et al. |
| 5,335,373 A | * | 8/1994 | Dangman et al. ........... 604/292 |
| 5,367,025 A | | 11/1994 | Needham |
| 5,772,640 A | * | 6/1998 | Modak et al. ............... 604/265 |
| 5,814,673 A | * | 9/1998 | Khait ........................... 521/48 |
| 5,881,901 A | * | 3/1999 | Hampton ...................... 521/48 |

FOREIGN PATENT DOCUMENTS

| | | |
|---|---|---|
| DE | 36 10 595 A1 | 6/1987 |
| DE | 39 34 711 A1 | 4/1991 |
| DE | 92 07 263.1 | 10/1992 |
| DE | 93 20 240.7 | 4/1994 |
| DE | 196 51 445 A1 | 6/1998 |
| EP | 112 542 B1 | 5/1989 |
| EP | 0 361 313 A2 | 4/1990 |
| EP | 0 579 576 A1 | 1/1994 |
| EP | 0 636 647 A1 | 2/1995 |
| GB | 1 511 495 | 5/1978 |
| JP | 58-042-644 A | 3/1983 |
| JP | 01-066-265 A | 3/1989 |
| WO | WO 94/29377 | 12/1994 |
| WO | WO 97/00906 | 1/1997 |

OTHER PUBLICATIONS

Hochmolekularbericht 1974 (Bst) (H.12548/74).
Uhlmanns Encyklopädie Der Technischen Chemie (1954) pp. 754–765.
Ullmann's Encyclopedia of Industrial Chemistry (5th completely revised edition) pp. 94–98.

* cited by examiner

Primary Examiner—Peter Szekely
(74) Attorney, Agent, or Firm—Herbert Dubno; Jonathan Myers

(57) ABSTRACT

A process for preparing a container for handling a household waste material which involves molding a household waste container from a plastic batch material containing 0.1 to 10% by weight of at least one phenol biocide selected from the group consisting of 5,5'-dichloro-2,2'-dihydroxydiphenyl methane, 3,5,3',5'-tetrachloro-4,4'-dihydroxydiphenyl methane, 3,5,6,3',5',6'-hexachloro-2,2'-dihydroxydiphenyl methane, 5,5'-dichloro-2,2'-dihydroxydiphenyl sulfide, 2,4,5,2',4',5'-hexachloro-dihydroxydiphenyl sulfide, 3,5,3',5'-tetrachloro-2,2'-dihydroxydiphenyl sulfide, and 2,4,4'-trichloro-2'-hydroxydiphenyl ether to form the container with an inner and an outer co-extruded layer wherein the phenol is applied on a co-extruded layer forming the surface of the inner co-extruded layer.

3 Claims, 5 Drawing Sheets

POLYMER COMPOSITION, THE PRODUCTION AND FURTHER PROCESSING THEREOF INTO RECEPTACLES

FIELD OF THE INVENTION

The invention relates to a polymer composition, to a corresponding master batch, to the preparation of this polymer composition or of this master batch, to the further processing of this polymer composition or of this master batch into containers, such as storage or transportation containers as well as disposal containers, and also to the use of phenols for the protection of the container contents in materials containing plastic, particularly in disposal containers made thereof.

BACKGROUND OF THE INVENTION

U.S. Pat. No. 3,075,940 relates to a sterically hindered phenol, especially in the form of a halogenated dihydroxydiphenyl methane (see middle of column 3), which serves to stabilize soft PVC (claim 1).

According to its set of claims, GB-A 1,511,495 relates to the use of 0.1% to 3% by weight of a special halogenated dihydroxydiphenyl sulfide as a stabilizer for polymers selected from polypropylene or other polyolefins, PVC or ABS. The stabilizer cited in that document is explicitly excluded from our application for protection, particularly since this British patent only provides for the use of the stabilizer as an antioxidant or as an agent to de-activate metal in the plastic mixture.

DE-A 196 51 445 relates to the use of bisphenols, as monomers for the preparation of polycarbonate polycyclene, as can be seen in formula VII on page 4, lines 38 through 66. This document does not provide specific information as to whether and bow much of these monomers are still to be found in the polymers in the end.

According to its main claim, EP-B 112,542 relates to polyamide molding compounds containing, relative to the polyamide, 0.5% to 15% by weight of at least one monophenol.

U.S. Pat. No. 5,367,025 relates to a cross-linkable composition containing polyethylene that can be further processed, for example, into containers, and that, in addition to polyolefins, also contains a cross-linking agent in the form of an organic peroxide initiator, at least 0.2% by weight of a polyalkylene benzene polycarbonate as well as, relative to 100 parts of the ethylene polymer, 0.2 to 2 parts by weight of a suitable cross-linking co-reagent, whereby this compound is selected from among sterically hindered phenol antioxidants whereby, however, exclusively non-halogenated antioxidants are cited in column 4, lines 52 through 64.

According to its main claim, U.S. Pat. No. 5,298,540 relates to a process to stabilize recycled mixtures of thermoplastic polymers, whereby this mixture contains 55% to 75% by weight of polyolefins, 5% to 25% by weight of polystyrene, 5% to 15% by weight of PVC and up to 10% by weight of other plastic polymers, whereby this mixture is put into contact with a combination of at least one sterically hindered phenol and at least one phosphite or phosphonite. The exclusively sterically hindered phenols cited in the patent have a characteristic halogen-free tert-butyl phenol group, as can be seen in column 3, top.

Ullmanns Enzyklopädie der technischen Chemie [Ullmann's Encyclopedia of Industrial Chemistry], $3^{rd}$ edition, Volume 5, page 757, describes the use of polyvalent phenols of the type defined in claim 1, but without indicating that they are a component of a polymer composition.

Ullmann's Encyclopedia of Industrial Chemistry, $5^{th}$ edition, Volume A3, also describes the class of hindered phenols in the passage about antioxidants; Table 3, however, does not show any representatives of a halogenated dihydroxydiphenyl methane, dihydroxydiphenyl sulfide or dihydroxydiphenyl ether.

It is common practice to use phenols as disinfectants, that is to say, in order to destroy pathogens as well as to protect plants, materials and food products against microbial attack. This is normally done in that the disinfectant withdraws water from the material to be protected, de-natures protein and brings about other protein changes, while other disinfectants block metabolic processes in the interior of the cells. The class of halogenated dihydroxydiphenyl methanes, dihydroxydiphenyl sulfides and dihydroxydiphenyl that are of particular interest here are employed especially as an additive for deodorizing and anti-bacterial soaps, body lotions and cleansers. In most cases, such substrates have melting points well above 100° C. [212° F.]. Particularly under the designation Irgasan® DP 300, Ciba-Geigy of Basel, Switzerland offers an anti-microbial agent for use in cosmetic preparations, and this agent is 2,4,4'-trichloro-2'-hydroxydiphenyl ether or 5-chloro-2-(2,4-dichlorophenoxy)-phenol or triclosan (INN). In addition lo its classical use in cosmetics, this product is also employed in conjunction with medications and medical products, particularly in the dental sector. Another widespread form of use consists in providing textile fibers and plastics with an anti-microbial finish, and this product also serves as an additive to prevent microbial contamination of water, aqueous solutions or air in technical installations such as, for instance, air-conditioning systems.

Moreover, it is known from Ullmanns Enzyklopaädie der technischen Chemie [Ullmann's Encyclopedia of Industrial Chemistry], $5^{th}$ edition, Volume 21, 1985. page 46 ff., that plastics themselves are not attacked by microorganisms. However, it would be advantageous to avoid contamination and the spread of microorganisms in re-useable containers that are meant to store food products or organic waste.

OBJECTS OF THE INVENTION

The present invention has the objective of providing a polymer composition that has a disinfecting effect, so that it can be further processed, particularly into containers where a disinfecting effect plays a role, for example, in the production of storage and transportation containers as well as disposal containers.

An additional objective of the present invention is the preparation of a polymer master batch that contains the above-mentioned additive and that can thus be further processed into the above-mentioned containers.

Another objective of the present invention is a preparation process for the above-mentioned polymer composition or for the above-mentioned polymer master batch.

Another objective of the present invention is the further processing of the above-mentioned polymer composition as well as of the above-mentioned polymer master batch into containers containing plastic, especially into storage and transportation containers and disposal containers of this kind.

Finally, another objective of the present invention is the use of phenols for the protection of the container contents as described above for materials containing plastic, particularly storage and transportation containers as well as disposal containers made thereof.

SUMMARY OF THE INVENTION

It was surprisingly found that, by using a specific quantity of a phenol that up until now has only been utilized in the cosmetic sector as well as in the classical disinfectant sector, it is possible to achieve a material-protecting, that is to say, disinfecting effect in conjunction with the above-mentioned special polymer compositions or with the polymer master batch.

Thus, the present invention relates to a polymer composition in which the polymer is selected from among polyolefins, styrene polymers and polymers containing halogen, except for soft PVC, linear polyesters, linear polycarbamates, high-temperature-resistant plastics as well as recycled material stemming from these types of plastic, characterized in that, relative to the total composition, they contain 0.01% to 10% by weight, preferably 0.05% to 2% by weight, of at least one phenol in the form of halogenated dihydroxydiphenyl methane, dihydroxydiphenyl sulfide and/or dihydroxydiphenyl ether, except for the dihydroxydiphenyl sulfides, 2,2'-thiobis(6-halogeno-4-$C_{1-8}$-alkyl phenol) and 2,2'-thiobis(6-halogeno-4-$C_{2-8}$-alkenyl phenol).

A preferred group of the phenols employed are the halogenated dihydroxydiphenyl methanes, dihydroxydiphenyl sulfides or dihydroxydiphenyl ethers which are selected, for instance, from among 5,5'-dichloro-2,2'-dihydroxydiphenyl methane (Preventol DD, Bayer AG), 3,5,3',5'-tetrachloro-4,4'-dihydroxydiphenyl methane (Monsanto Corporation), 3,5,6,3',5',6'-hexachloro-2,2'-dihydroxydiphenyl methane (hexachlorophene), 5,5'-dichloro-2,2'-dihydroxydiphenyl sulfide (Novex, Boehringer Mannheim), 2,4,5,2',4',5'-hexachloro-dihydroxydiphenyl sulfide, 3,5,3',5'-tetrachloro-2,2'-dihydroxydiphenyl sulfide (Actamer, Monsanto), 4,4'-dihydroxy-2,2'-dimethyl-diphenyl methane, 2',2-dihydroxy-5',5-diphenyl ether (Unilever), 2,4,4'-trichloro-2'-hydroxydiphenyl ether (Irgasan DP 300, Ciba-Geigy).

Among the above-mentioned phenol groups, the group consisting of halogenated dihydroxydiphenyl methane, dihydroxydiphenyl sulfide and dihydroxydiphenyl ether has proven to be especially preferred and, in this context, particularly the above-mentioned 2,4,4'-trichloro-2'-hydroxydiphenyl ether which, in view of its high $LD_{50}$ value, is practically non-toxic and does not accumulate in the body. Due to its high degradation point of more than 280° C. [536° F.], there is practically no degradation or any significant transition to the gas phase when the substrate is incorporated into the master batch or into the polymer composition.

The above-mentioned phenol additive is meant to be added to a polymer composition. With this polymer composition, the polymer is selected from among polyolefins, styrene polymers, polymers containing halogen, linear polyesters, linear polycarbamates, high-temperature-resistant plastics as well as recycled material stemming from these types of plastic.

As defined in the present invention, the term polyolefins refers to polyethylene and the subtypes of polyethylene, namely, LDPE with typical densities ranging from 0.918 to 0.950 g/dm³, HDPE with a typical density between 0.95 and 0.96 g/dm³, special copolymers of ethylene, such as LLDPE, EVA, EBA, EEA, EAS, EVK as well as ETFE, mixtures of polyethylene with other polymers, a chemical modification of polyethylene in the form of PEC, CSM and VPE. Other important representatives of polyolefins are polypropylene, the copolymers and polyblends of polypropylene, such as EPB, EPDM, EPM as well as EPTR. Other kinds of polyolefins are polybutene, polymethyl pentene as well as polyisobutylene.

Examples of styrene polymers to be employed as polymers are polystyrene itself as well as the copolymers of styrene and polyblends such as, for instance, the statistical polymers SAN, ASVK, SAS, BS, graft copolymers and polyblends as impact-resistant amorphous thermoplastics, such as SB, ABS, MOBS, MABS, ASA, ACS, AES as well as ES, 3-block-copolymers as thermoplastic elastomers, such as SBS, SIS and SEPS.

Examples of polymers containing halogen that can be used in the above-mentioned polymer compositions are PVC itself, in other words, so-called rigid PVC, polyblends with PVC as impact-resistant PVC types such as, for instance, ACVC/PVC, EVA/PVC, MBS/PVC, PEC/PVC and ABS/PVC. Moreover, statistical copolymers such as, for example, VCVAC, VCS, VCAN and VCDVC can also be used. Examples of additional polymers containing halogen are polyvinylidene chloride, polyvinylidene fluoride and polyvinyl fluoride.

The additional linear polyesters used in the polymer compositions according to the invention are polyethylene terephthalate, polybutylene terephthalate, block copolymers as thermoplastic elastomers as well as polycarbonates.

Another plastic group incorporated according to the invention into the polymer composition is made up of linear polycarbamates, also including the polyurethanes produced by means of addition polymerization to diisocyanates or polyisocyanates as a stage reaction of dihydroxy or polyhydroxy compounds.

Finally, mention should also be made of the high-temperature-resistant plastics for use according to the invention in the polymer compositions such as, for instance, polyphenylene, poly-p-xylylene, polyphenylene oxide polystyrene, polysulfone, polyether sulfone, polyphenylene sulfide, polyphenylene sulfone, polymethacrylimide, polyimide, polyesterimide and polyetherimide. Instead of the above-mentioned plastic classes, it is also possible to utilize the corresponding plastics that have been recovered in a recycling process and separated according to their material class.

It is particularly preferred to employ a polyethylene, especially an HD-PE, within the scope of the above-mentioned polymer composition. Particular preference is given to setting the proportion of phenol in this polymer composition at 0.1% to 2% by weight, especially at 0.2% to 0.5% by weight.

In this context, it is a matter of course that the above-mentioned polymer composition, aside from the pure plastic, also contains the auxiliaries and additives commonly present in plastics, for instance, fillers and/or colorants in the form of organic and inorganic pigments. These auxiliaries and additives are present in the composition in amounts ranging from 0.5% to 5% by weight, preferably 1% to 2% by weight, relative to the total composition. Naturally, the above-mentioned auxiliaries and additives also include the familiar substances, such as light-stability agents like, for example, UV-absorbers or anti-static agents and heat stabilizers. Examples of fillers in the storage and transportation sectors are chalk, talcum, fiberglass.

Examples of pigments are furan carbon black, chromium oxide green, silicon dioxide, titanium dioxide and phthalocyanines.

Hals is an example of a light-stability additive.

Examples of heat stabilizers are compounds on the basis of (3,5-di-tert-butyl-4-hydroxyphenyl)-propionic acid esters, for instance, pentaerythritol or octadecanol, which are sold by Ciba-Geigy under the brand name Irganox®.

Another feature of the present invention is a polymer master batch that is characterized in that, relative to the total composition of this master batch, it contains 0.1% to 20% by weight, preferably 1% to 5% by weight, of at least one phenol. The above-mentioned master batch is preferably produced in the form of granules, whereby, as elucidated above, the qualitative formulation of the phenol and of the polymer can be like the above-mentioned polymer composition. The other additives cited above are present in the master batch in amounts ranging from 1% to 50% by weight, preferably from 1% to 5% by weight, relative to the total composition.

According to another preferred embodiment, the above-mentioned master batches are produced in such a manner that basic polymer granules are heated to their melting temperature together with the additives and subsequently granulated. This is done, for instance, by thoroughly mixing the components together in a Rhön wheel mixer, after which they are melted and granulated in a commercially available granulator. In order to produce the finished parts, an appropriate quantity of master batch is added to the basic polymer by means of special metering devices (gravimetrically or volumetrically).

Another feature of the present invention is the further processing of the above-mentioned polymer composition in a familiar manner by means of injection molding, rotomolding, injection blow molding or other conventional extrusion processes as well as blow molding.

When one of the above-mentioned basic polymers is employed as the starting material, then the further processing into the containers used according to the invention, particularly the storage and transportation containers as well as the disposal containers, is carried out by means of the addition of the appropriate polymer-master batch granules containing phenol, whereby these granules can be further processed by the above-mentioned methods, especially by injection molding or injection blow molding, to form the containers, particularly the storage and transportation containers as well as the disposal containers.

Another feature of the present invention is the use of phenols for the protection of the container contents for materials containing plastic, especially the containers made thereof. Moreover, it is also possible to employ this phenol as a biocide.

As defined in the present invention the term containers refers in particular to storage and transportation containers of the type described, for example, in German standard DIN 30820, Parts 1, 2, 4 to 9 and to disposal containers as described in DIN EN 840 1-6.

Moreover, this term also refers to disposal containers of the type employed in households in the form of the typical 10-liter container and, in the disposal sector, to the typical 120 liter size used in garbage cans. Within the scope of the use according to the invention, this term also refers to a pre-sorting or interim-storage container used for organic waste, of the type made, for instance, of recycled material. Such containers typically have volumes in the order of magnitude from 10 to 1000 liters, preferably from 100 to 250 liters.

Within the framework of the above-mentioned use, it is preferred for the phenols to be present in an amount ranging from 0.01% to 10% by weight, preferably from 0.05% to 2% by weight, relative to the total composition in each case, either already in the material containing plastic or in a corresponding quantity in the polymer-master batch granules.

The phenols are applied as a co-extruded layer onto at least part of the surfaces containing plastic, particularly on the inner surface.

The present invention will be elaborated upon below with reference to embodiments.

Disks measuring 6 mm and having a thickness of 3 mm are employed as the test specimens in the microbiological experiments, while plates measuring 20 mm×20 mm and having the same thickness are used in the migration tests, each time with and without Irgasan DP 300.

For purposes of determining the concentration by means of the inhibiting zone tests, *Klebsiella pneumoni* (ATCC 4352) and *Staphylococcus aureus* (ATCC 6538) were bred on casein soy-meal broth (CM, oxoid), then plated out onto casein-peptone soy-meal agar (CM 131, oxoid) and incubated at 37° C. [98.6° F.]. Up to 50 $\mu$l of Irgasan DP 300 were applied onto 6-mm filter disks.

A Hitachi U-1100 spectral photometer in conjunction with reduced acrylic cuvettes (product no. 67.740, Sarstedt) with a 500-$\mu$l sample volume was employed for the ultraviolet spectroscopic determination of the concentration at a wavelength of 285 nm.

The calculation formula of the service life described below turns out to be the following:

$$V_s = \frac{T_c}{M \times E_i \times T}[\%],$$

wherein $V_s$=sump volume [%] as a percentage of the total volume
$T_c$=total content [mg]
M=migration [ppm/l]
Ei=emptying interval [1/years]
T=service life [years]

For a loss of 2 ppm of Irgasan DP 300 per liter of sump volume, this results in the following:

$$y = \frac{42.3}{x}[\%],$$

and correspondingly for a loss of 10 ppm of Irgasan DP 300:

$$y = \frac{211.5}{x}[\%].$$

with x=service life in years and y=volume (%, as a percentage of the total volume)

Example of an Embodiment

A sensitive microbiological test is to be employed in order to quantitatively detect microbial contamination in test specimens made of HDPE as well as the migration of the Irgasan DP 300 out of the plastic, in order to be able to estimate the release of active ingredient over the service life. An attempt was also made to follow the migration of Irgasan DP 300 and of the stabilizers by means of ultraviolet spectroscopy.

For this purpose, first of all, a test was drawn up that makes it possible to quantitatively detect the anti-microbial effect of test specimens containing 0.2% Irgasan DP 300 and Irgasan DP 300 as a pure substance. In order to examine the migration of the additive and the sensitivity of various test germs, an inhibiting zone test was conducted: test specimens were incubated on agar plates that had been inoculated with these germs. As indicators, two microorganisms were employed whose minimum inhibiting concentration (MIC) with respect to Irgasan DP 300 was between 0.01 ppm and 0.3 ppm, according to information provided by the manufacturer. The kinetics of the release of active ingredient into an aqueous solution were examined by incubating test specimens in a defined volume and by subsequently evaluating them with a spectroscope as well as in the inhibiting zone test. Both methods were calibrated by means of parallel batches with the pure substance.

BRIEF DESCRIPTION OF THE DRAWINGS

The present invention will be elaborated upon below with reference to the drawings (Figure).

The following is shown.

DETAILED DESCRIPTION OF THE DRAWINGS

Figure 1:
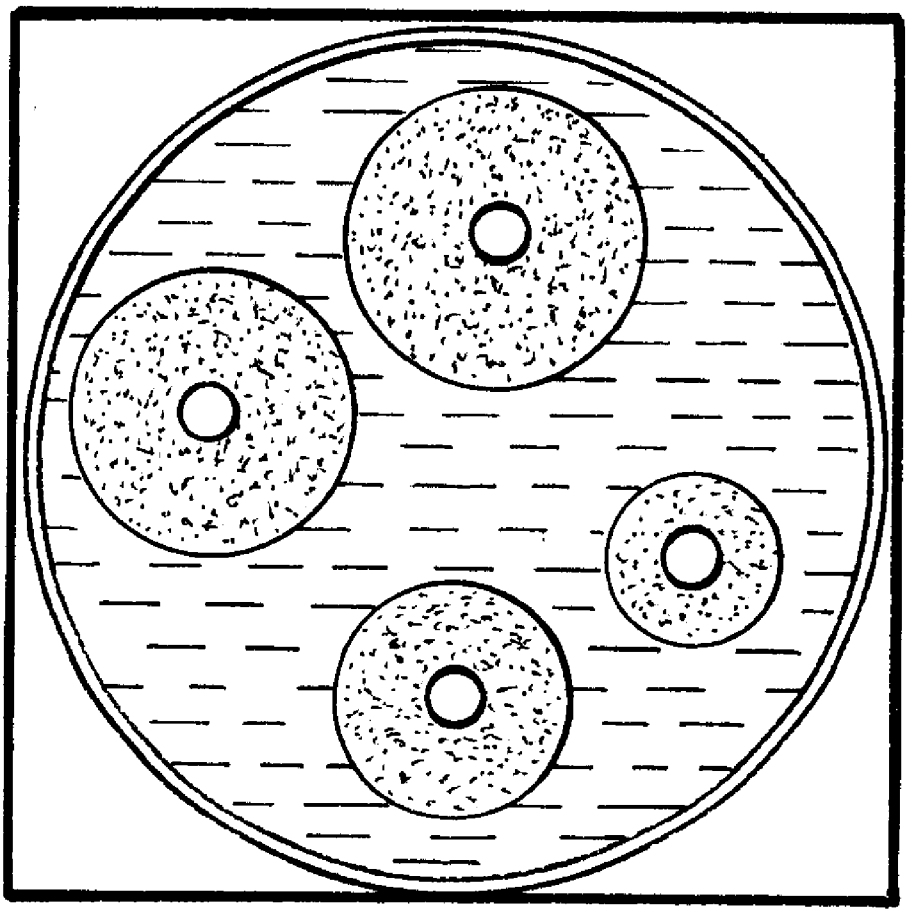
FIG. 1—a Petri dish with agar nutrient medium onto which the various concentrations of Irgasan DP 300 have beer applied after an incubation period of 16 hours.

FIG. 1 shows the dependence of the surface area of the inhibiting zones on the various concentrations of Irgasan DP 300 after approximately 16 hours of incubation on agar plates with a nutrient medium. The concentric dark rings do not exhibit any microbial growth. However, the filter in the center of the agar plate that is barely visible against the background of the bacteria growth did not contain any Irgasan DP 300.

In this context, the diameter or the surface area of the inhibiting zones behave in a way that is proportional to the concentration used, although they are also dependent on the sensitivity of the appertaining microorgarism with respect to the active ingredient used. In the case of Irgasan DP 300, suitable microorganisms—in view of their specificity and sensitivity—can compete with the most sensitive chemical detection methods.

Since, as a rule, it can be assumed that interactions with the nutrient media occur, specimens of an unknown concentration always yield a relative measurement that only yields absolute values once it has been compared with the concentration series of the pure substance. Accordingly, the information pertaining to the minimum inhibition concentration of microorganisms is always related to a specific nutrient substrate.

Figure 2:
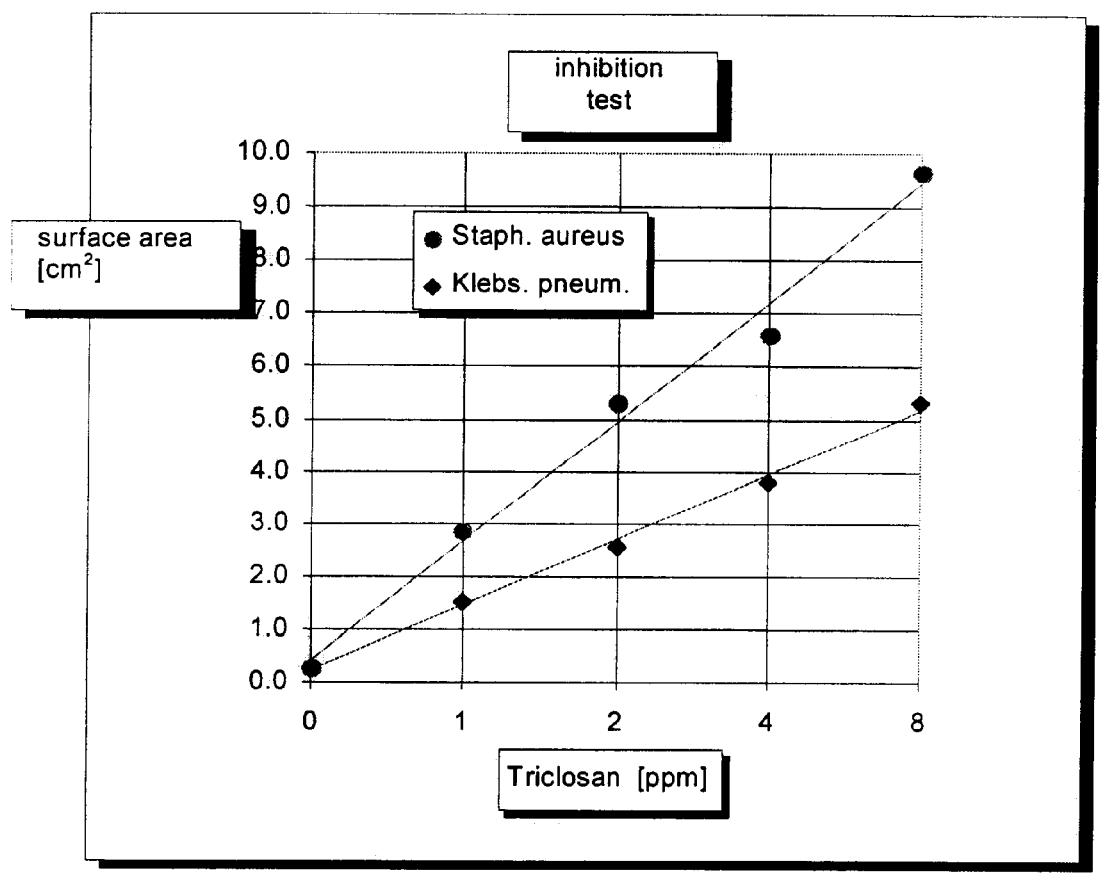
FIG. 2—a typical inhibition test with an application of the Irgasan DP 300 (triclosan) concentration in the ppm range plotted against the surface area in $cm^2$.
Figure 3:
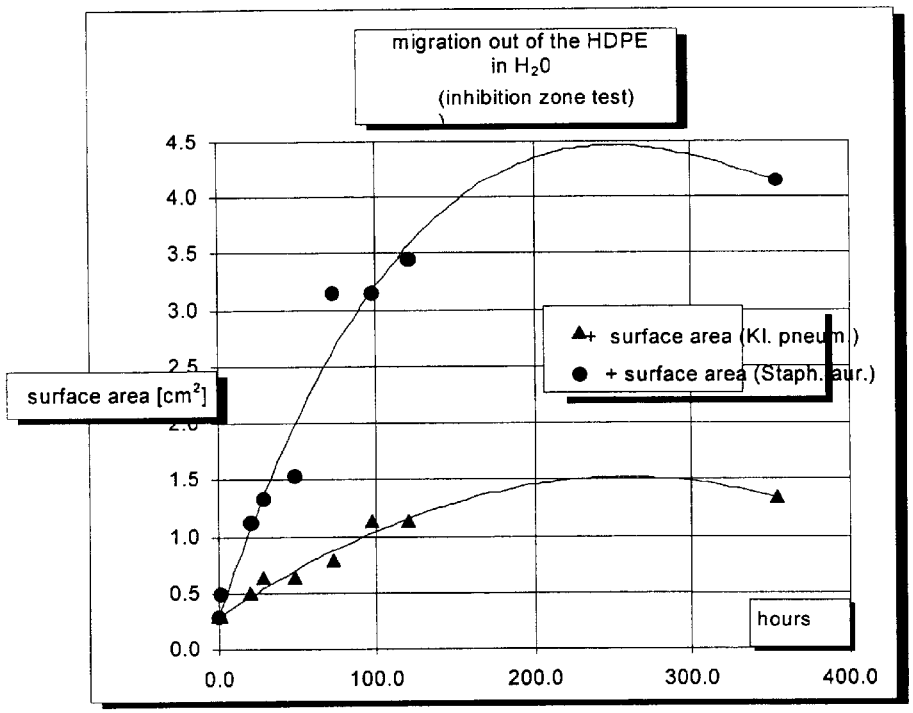
FIG. 3—the migration out of the HDPE in Tater (in the inhibiting zone test) during a period of time of up to 400 hours.
Figure 4:
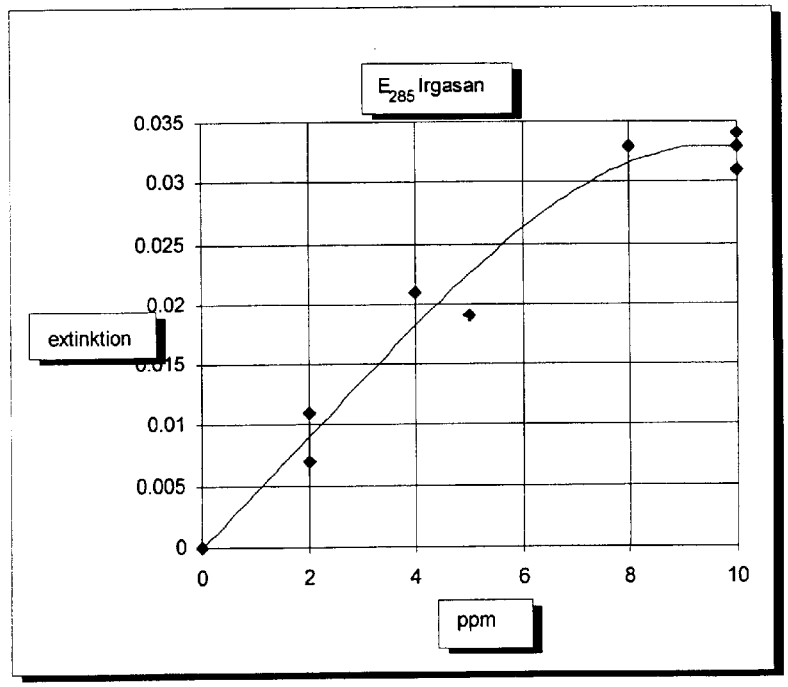
FIG. 4—the plotting of the extinction at 285 nm for a weight range of up to 10 ppm.
Figure 5:
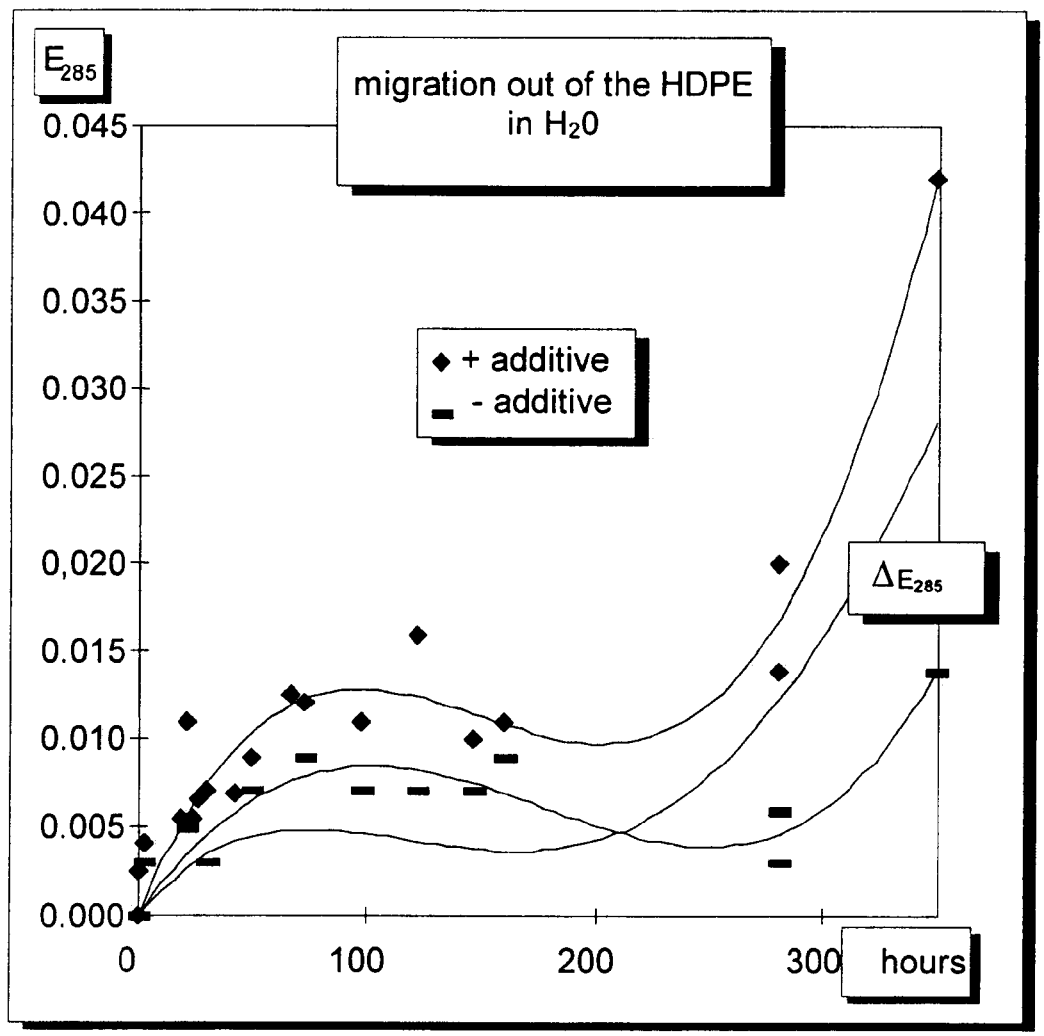
FIG. 5—the migration out of the HDPE in water (as extinction)

FIG. 2 depicts the surface area of the growth-free zones as a function of the concentration of Irgasan DP 300 (triclosan) in ppm. The saturation concentrations of triclosan in water at room temperature are about 10 ppm, that is to say, 10 mg per liter. The amount of triclosan that, over the course of 14 days in water, migrates out of a test specimen having a defined surface area was determined in parallel by means of the inhibition zone test (FIG. 3) as well as by ultraviolet spectroscopy (FIG. 5). A comparison with the corresponding pure substances serves to estimate the order of magnitude (FIGS. 2 and 4).

The differences ($\Delta$) of the extinctions obtained from experiments with and without triclosan are widely scattered between the various batches and within the test series. This is due to the small extinction values, which lie close to the lower detection limit, and to the low specificity of the method as well as possibly also to non-homogeneities in the distribution of the triclosan in the injection-molded samples.

Nevertheless, it can be seen in FIG. 5 that the triclosan concentration that can be reached within 14 days under optimal test conditions (agitation) lies below the saturation concentration in the water. The concentration that can be reached under practical conditions is probably between 2 ppm arid 10 ppm, depending on the length of the emptying intervals. The curves, which rise steeply after 2 weeks, should not be overestimated. This is due to the widely scattered values and to the mathematical regression model employed.

Figure 6:
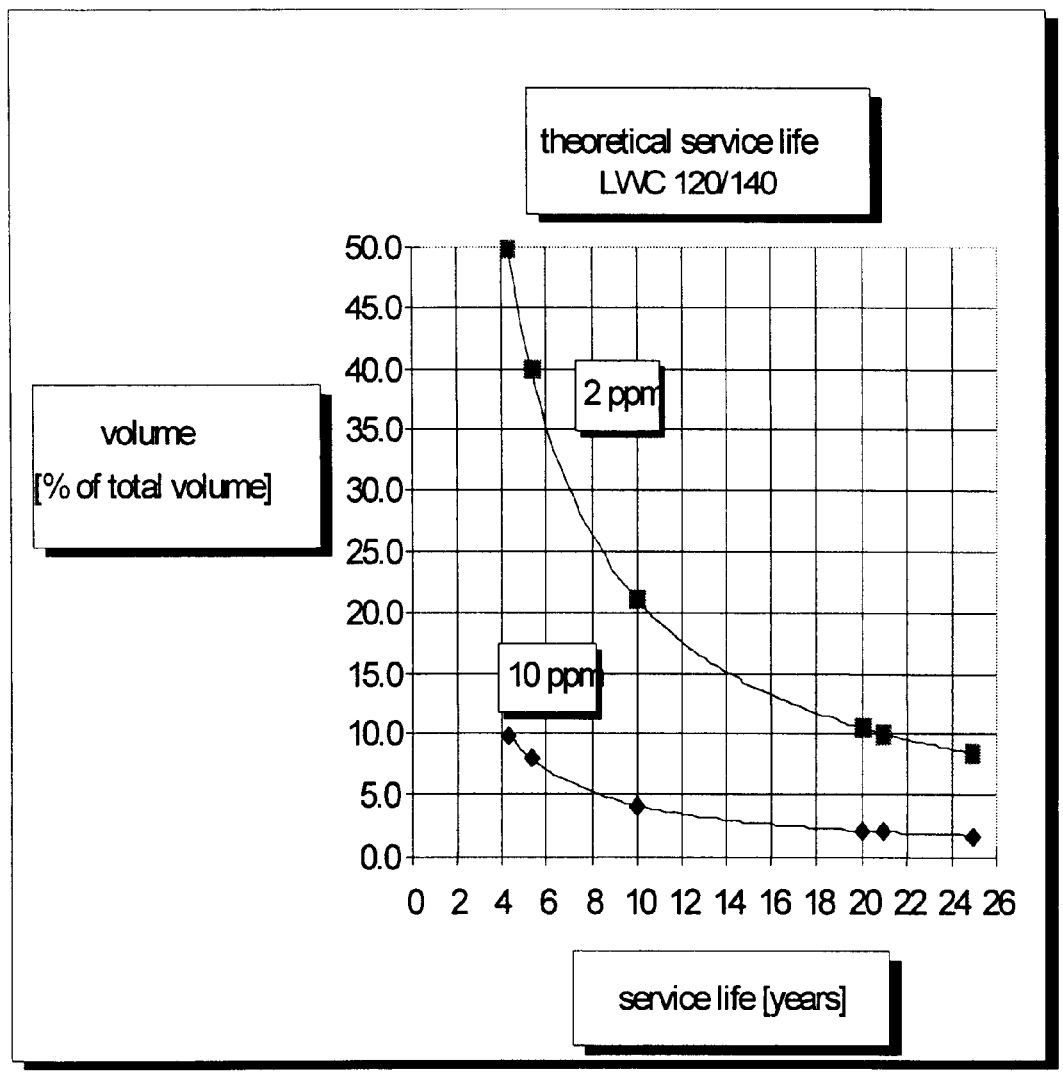
FIG. 6—the theoretical service life of a disposal container or Large Waste Container (LWC 120/140 liters) plotted against the sump volume as a percentage of the total volume.

FIG. 6 shows the range of the maximum sump volumes resulting from the above-mentioned calculation formula, with contents between 2 ppm and 10 ppm of triclosan as a function of the service life of the container. The liquid that collects at the bottom of the container is designated as the sump.

In the evaluation of the results, a distinction must be made between the surface effect and the effect on the liquid and solid container contents.

As far as the surface is concerned, an effect can be assumed that corresponds to at least a 10-ppm solution of triclosan. Experiments with microorganisms having a higher minimum inhibiting concentration (MIC)—the concentration in the HDPE lies at about 200 ppm—can provide information about a more intense effect. Keeping the container surface clean will probably play an additional role when it comes to contamination or a re-infection of the container contents.

In terms of the container contents, a satisfactorily effect can only be assumed to occur in the sump, even when the achievable concentration lies below 10 ppm of triclosan.

Regarding the service life that can be achieved, the results show that already 0.2% triclosan in the HDPE after a 14-day emptying time allows us to expect that the effect will be adequate even after more than 5 years even under unfavorable conditions. Moreover, the concentrations of triclosan that can be achieved in the liquid waste material are suitable in principle to inhibit a considerable proportion of the relevant microbial flora. To that extent, triclosan appears to be extremely well-suited for use in storage and transportation containers, but especially in disposal containers, for example, in so-called organic or residual-waste containers. In addition, the proper utilization of organic garbage cans treated with triclosan does not pose any appreciable problems in households or in the subsequent composting.

What is claimed is:

1. A process for preparing a container for handling a household waste material which comprises molding a household waste container from a plastic batch material containing 0.1 to 10% by weight of at least one phenol biocide selected from the group consisting of 5,5'-dichloro-2,2'-dihydroxydiphenyl methane, 3,5,3',5'-tetrachloro-4,4'-dihydroxydiphenyl methane, 3,5,6,3',5',6'-hexachloro-2,2'-dihydroxydiphenyl methane, 5,5'-dichloro-2,2'-dihydroxydiphenyl sulfide, 2,4,5,2',4',5'-hexachloro-dihydroxydiphenyl sulfide, 3,5,3',5'-tetrachloro-2,2'-dihydroxydiphenyl sulfide, and 2,4,4'-trichloro-2'-hydroxydiphenyl ether to form the container with an inner and an outer co-extruded layer wherein the phenol is applied on a co-extruded layer forming the surface of the inner co-extruded layer.

2. The container for handling a household waste material prepared by the process defined in claim 1.

3. A process for handling a household waste material which comprises the steps of (a) molding a household waste container from a plastic batch material containing 0.1 to 10% by weight of at least one phenol biocide selected from the group consisting of 5,5'-dichloro-2,2'-dihydroxydiphenyl methane, 3,5,3',5'-tetrachloro-4,4'-dihydroxydiphenyl methane, 3,5,6,3',5',6'-hexachloro-2,2'-dihydroxydiphenyl methane, 5,5'-dichloro-2,2'-dihydroxydiphenyl sulfide, 2,4,5,2',4',5'-hexachloro-dihydroxydiphenyl sulfide, 3,5,3',5'-tetrachloro-2,2'-dihydroxydiphenyl sulfide, and 2,4,4'-trichloro-2'-hydroxydiphenyl ether to form the container with an inner and an outer co-extruded layer wherein the phenol is applied on a co-extruded layer forming the surface of the inner co-extruded layer; and (b) storing household waste in said container so that the household waste is at least partially sterilized by the phenol biocide.

* * * * *